(12) United States Patent
Gotou et al.

(10) Patent No.: US 6,530,253 B1
(45) Date of Patent: Mar. 11, 2003

(54) METHOD FOR PRODUCING CYLINDRICAL MEMBER HAVING SPLINE GROOVES, AND CYLINDRICAL MEMBER HAVING SPLINE GROOVES

(75) Inventors: Masahiro Gotou, Anjo (JP); Masaki Nakajima, Anjo (JP); Yuji Nakai, Anjo (JP); Hideyuki Nagai, Anjo (JP); Daisuke Iwata, Anjo (JP); Naohisa Momiyama, Anjo (JP); Ken Shimizu, Anjo (JP); Masahiro Ishikawa, Anjo (JP); Tomohiro Sugiura, Anjo (JP)

(73) Assignee: Aisin AW Co., Ltd. (JP)

( * ) Notice: Subject to any disclaimer, the term of this patent is extended or adjusted under 35 U.S.C. 154(b) by 123 days.

(21) Appl. No.: 09/665,080

(22) Filed: Sep. 19, 2000

(30) Foreign Application Priority Data

Sep. 20, 1999 (JP) ............................ 11-266062

(51) Int. Cl.$^7$ ............................................. B21D 22/00
(52) U.S. Cl. ............................ 72/85; 72/102; 72/110; 29/893.32; 192/70.2
(58) Field of Search ...................... 72/82, 83, 84, 72/85, 102, 110; 29/893.32; 192/70.2

(56) References Cited

U.S. PATENT DOCUMENTS

| 5,384,949 | A | * | 1/1995 | Wodrich et al. | ............... | 72/84 |
| 5,718,311 | A |   | 2/1998 | Victoria et al. |   |   |
| 5,737,955 | A | * | 4/1998 | Ohya et al. | ..................... | 72/102 |
| 5,806,358 | A | * | 9/1998 | Rolf | ............................... | 72/82 |
| 5,934,126 | A | * | 8/1999 | Maruki et al. | .................. | 72/85 |
| 6,223,576 | B1 | * | 5/2001 | Mashita | ........................ | 72/102 |

FOREIGN PATENT DOCUMENTS

| DE | 3931599 | * | 2/1991 | .................... | 72/82 |
| JP | 9-317848 |   | 12/1997 |   |   |
| JP | 11-010244 |   | 1/1999 |   |   |

* cited by examiner

Primary Examiner—Ed Tolan
(74) Attorney, Agent, or Firm—Lorusso & Loud

(57) ABSTRACT

The disclosed method produces a spline-grooved cylindrical member, e.g. torque converter front cover, including a cylindrical portion having a target wall thickness t2, from a plate blank having a plate thickness t1. An outer peripheral portion of a disc-shaped blank is plastically deformed by pressing it against a mandrel with the concave peripheral edge of a thickness-increasing roller, so that a thick wall portion, of a thickness greater than the plate thickness t1 of the blank, is formed in the cylindrical portion. The thick wall portion is then pressed against the mandrel by forming rollers to form spline grooves therein. Thus, the other portions of the product have a wall thickness which is not unnecessarily increased. In this manner, the wall thickness t2 of the cylindrical portion is not entirely dictated by the wall thickness t1 of the blank material. Thus, a cylindrical member resistant to high pressures acting on its axially-extending outer cylindrical portion can be produced with an optimal configuration.

8 Claims, 8 Drawing Sheets

METHOD FOR PRODUCING CYLINDRICAL MEMBER HAVING SPLINE GROOVES, AND CYLINDRICAL MEMBER HAVING SPLINE GROOVES

BACKGROUND OF THE INVENTION

1. Field of the Invention

The present invention relates to a method for producing an integrally formed cylindrical member, having spline grooves on its inner surface, from a disc-shaped material by cold forming and to the cylindrical member produced by the method.

2. Description of the Related Art

A conventional front cover of a torque converter has a spline-grooved drum, that is attached to the front cover by welding or the like, for mounting clutch plates of a lockup clutch, as described in, for example, Japanese Patent Application Laid-Open No. HEI 9-317848.

However, the above-described construction necessitates welding the front cover to the drum. Therefore, this construction is labor intensive, creates a possibility of metal fines remaining inside, and requires a high level of quality control. Furthermore, there are also the drawbacks of an increased number of component parts and an increased cost.

To solve these problems, U.S. Pat. No. 5,718,311, for example, proposes a method for forming a front cover portion together with spline grooves by cold forming. However, simple employment of cold forming results in a considerable reduction in the wall thickness of an outer cylindrical portion of the front cover in which the spline grooves are formed. Since the outer cylinder portion of a torque converter receives high hydraulic pressures due to centrifugal forces caused by rotation of the turbine, the outer cylindrical portion requires a wall thickness that can withstand such high hydraulic pressures.

One measure for securing such a wall thickness is to merely increase the wall thickness of the entire front cover. However, by this approach even the central portion of the front cover, that does not need to be resistant to such high pressures, is formed with a thick wall. Thus, there are problems of a weight increase of the front cover and therefore a weight increase of the entire torque converter.

SUMMARY OF THE INVENTION

Accordingly, it is an object of the invention to provide a method of producing a spline-grooved cylindrical member that is capable of provision of a proper wall thickness for an outer cylindrical portion of the cylinder member in a process of cold forming, and a cylindrical member having spline grooves.

One aspect of the invention provides a method for producing a cylindrical member, having at least one spline groove on the inner surface of its outer cylindrical portion, from a disc-shaped blank material. In the method, a thick wall portion, whose thickness is greater than the plate thickness of the blank, is formed in the outer cylindrical portion through plastic deformation of the outer peripheral portion of the blank material by pressing with a roller. The outer peripheral portion of the cylindrical member is then formed integrally with the spline groove portion by pressing the thick wall portion of the blank against a mandrel having spline grooves corresponding to the spline grooves to be formed in the outer peripheral portion, through use of a forming roller.

Figure 3:
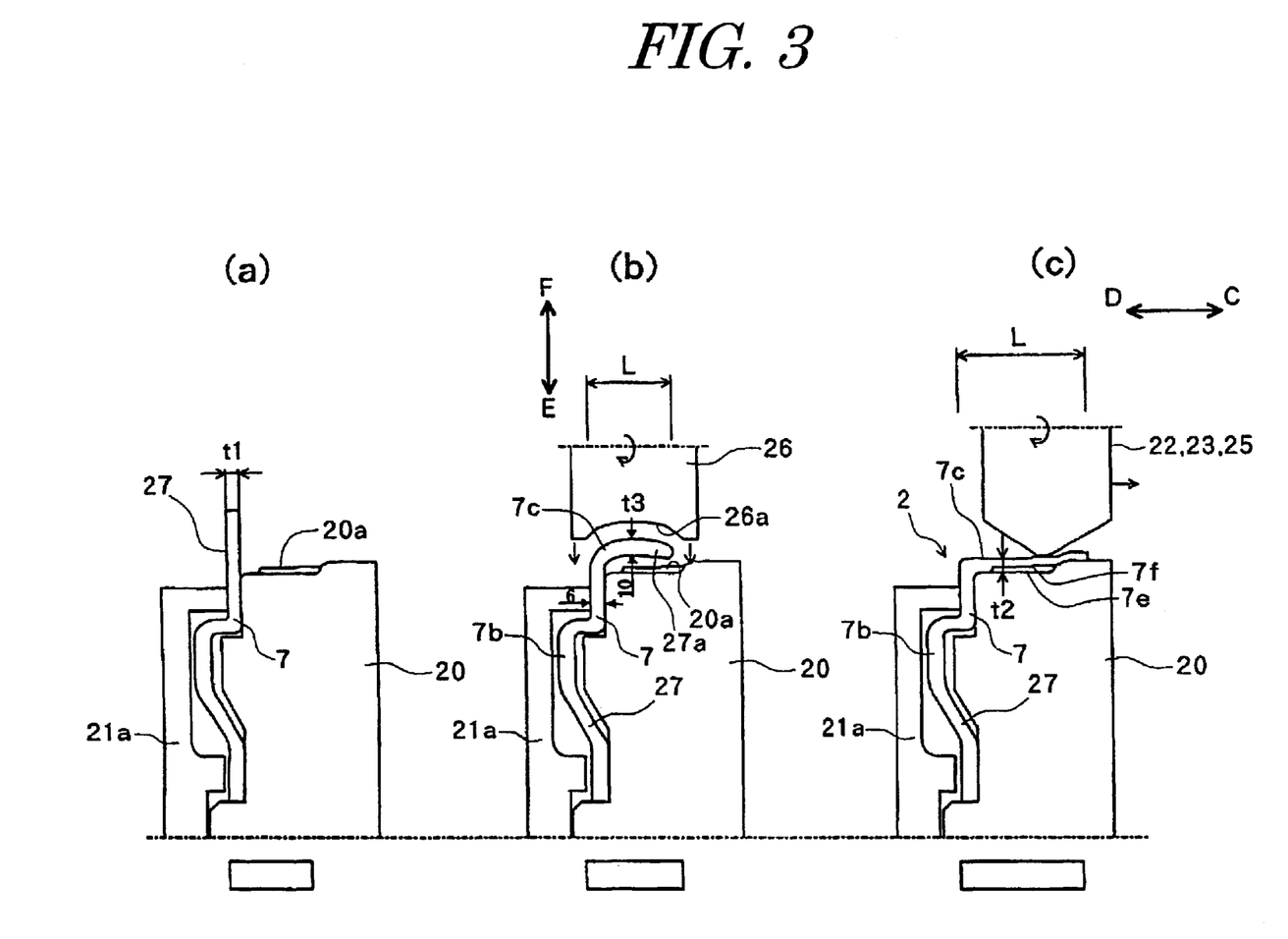
FIGS. 3(a) to 3(c) are diagrams illustrating a mandrel used in the process.

The direction of the force applied to the blank, in pressing the outer peripheral portion against the mandrel by the thickness-increasing roller, is not critical so long as the outer peripheral portion of the blank material is thickened. For example, the thickness-increasing roller may be pressed against the outer peripheral portion in the direction indicated by an arrow E in FIG. 3. Movement of the thickness-increasing roller may also be in the direction indicated by arrows C, D, in accordance with the configuration of the thick wall portion, the dimensions of the thickness-increasing roller, etc. Optionally, the thickness-increasing roller may be pressed in a direction obliquely against the blank, i.e. in a direction intermediate the direction indicated by the arrow E and the direction indicated by the arrow C or D.

In the above-described method, the outer cylindrical portion is pressed to provide a wall thickness that is greater than the wall thickness of the blank, using the thickness-increasing roller, before cold forming of the outer cylindrical portion using the forming roller. Therefore, although in the conventional method it is necessary to use a blank of an overall thickness equal to the desired wall thickness of the outer cylindrical portion, the method of the present invention is able to form a thick-walled cylindrical member capable of withstanding high pressure acting on its outer cylindrical portion without limitation to the wall thickness of the blank. Therefore, even after forming the spline groove, a wall thickness at the bottom of the groove greater than the wall thickness of the blank can be realized. Hence, a cylindrical member capable of withstanding high pressures acting in its outer cylindrical portion can be produced from a plate having a wall thickness this is less than the final wall thickness of the outer cylindrical portion. Therefore, a useless thickness of material in other portions is avoided, and a cylindrical member having an optimal configuration can be produced. Furthermore, since the outer cylindrical portion does not need to be reinforced by a separate member, there is no need for labor-intensive welding or the like, thereby eliminating the problem of sputters of welding material, and the like.

In the above-described method, the mandrel used to form the thickened wall portion through use of the thickness-increasing roller and the mandrel used for formation of the spline groove in cooperation with the forming roller may be one and the same mandrel.

If the thickness-increasing step utilizing the thickness-increasing roller and the spline groove forming step utilizing the forming roller are performed using a single mandrel, the operation of replacing the mandrel with different mandrel for each step of processing the blank material is omitted, thereby simplifying the production process.

In another aspect the invention provides a cylindrical member with a spline groove produced by the method of the invention described above.

Therefore, since the cylindrical member having a high-pressure-resistant thick-wall outer cylindrical portion and a thin-wall portion of a thickness corresponding to the thickness of the blank is produced from a single piece of blank material, there is no need to reinforce the outer cylindrical portion with a separate member. Therefore, it becomes possible to provide a simple-constructed cylindrical member having a reduced number of component parts.

The cylindrical member may have a radically-extending wall portion that retains the plate thickness of the blank material. Therefore, since the radical wall portion of the cylindrical member, which does not receive so a high pressure in comparison with the outer cylindrical portion, is formed retaining the plate thickness of the blank, it is possible to provide a light-weight and rational cylindrical member not having any excess material.

The cylindrical member may be a front cover for a torque converter.

When the invention is applied to a front cover of a torque converter, the front cover, in which a higher hydraulic pressure acts on its outer cylindrical portion than on its radical sidewall portion, can be formed from a single piece of blank material, together with spline grooves. Therefore, it becomes possible to provide a simply-constructed front cover having a reduced number of component parts.

The cylindrical member of the invention may be a front cover of a torque converter in which the spline groove has a stepped portion adjacent its distal end, with a greater groove depth toward the distal end (the right side in FIG. 2), and in which a snap ring engagement groove is formed in that stepped portion.

Therefore, the stepped portion formed in the spline groove increases the depth of the spline groove, so that a fluid passage can be secured between the outer peripheral edge of a snap ring, fitted into the snap ring engagement groove, and the spline groove bottom. Therefore, circulation of a lubricating fluid can be promoted, and a highly reliable construction can be achieved.

Furthermore, in the invention, the outer cylindrical portion may be formed so that the wall thickness at the groove bottom is substantially equal to or greater than the wall thickness of the blank. Therefore, after a wall thickness greater than the thickness of the blank material is formed by the thickness-increasing roller, the spline groove can be formed by the forming roller so as to provide a wall thickness at the bottom of the groove substantially equal to or greater than the wall thickness of the blank. Therefore, the cylindrical member can sufficiently withstand the high pressure that acts thereon in use as a torque converter front cover.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described hereinafter with reference to the accompanying drawings.

Figure 1:
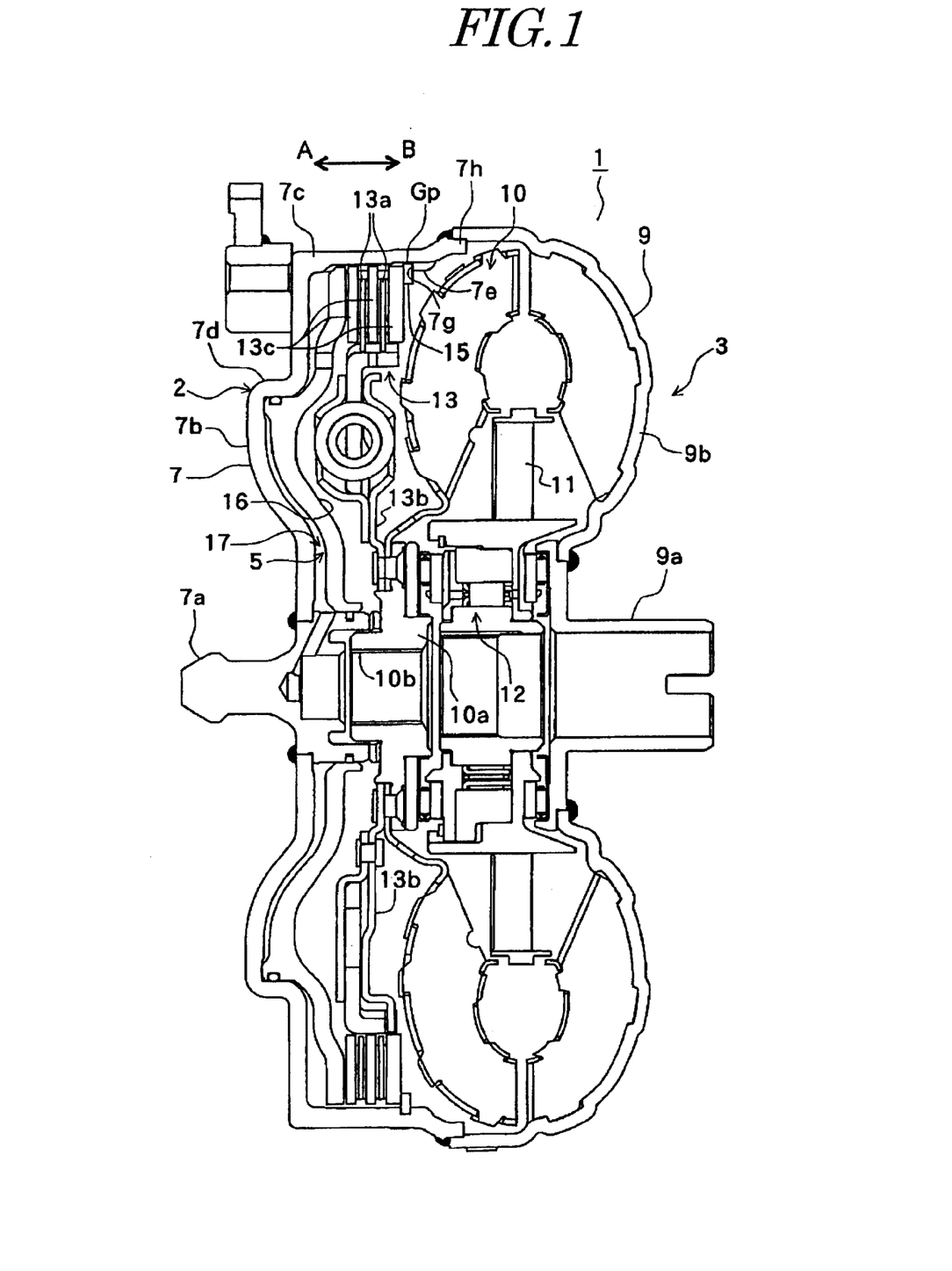
FIG. 1 is a sectional view illustrating a torque converter with a front cover
Figure 2:
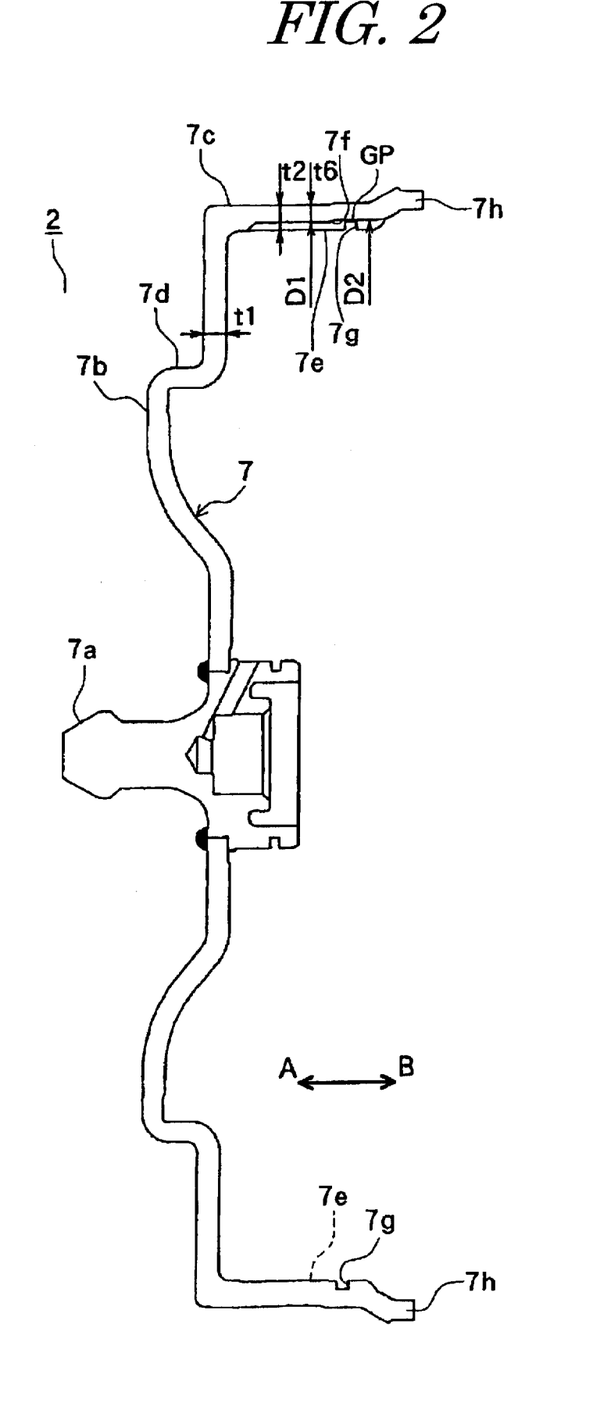
FIG. 2 is a sectional view illustrating portions of the front cover of FIG. 1.

Referring to FIG. 1, a torque converter 1 has a front cover 2, a torque converter body 3, and a lockup device 5. The front cover 2 has a body 7 that is formed into a cylindrical shape overall, as shown in FIG. 2. The body 7 has a boss portion 7a, a disc-shaped side wall portion 7b formed around the boss portion 7a, and an outer cylindrical portion 7c extending from the side wall portion 7b parallel to the center axis of the body 7, that is in the direction indicated by arrows A, B. A cylinder portion 7d is formed in the sidewall portion 7b. The inner cylindrical surface of the outer cylindrical portion 7c has splines 7e that extend in parallel, in the direction indicated by the arrows A, B, and that are arranged over the entire inner cylindrical surface.

The wall thickness of the outer cylindrical portion 7c in this embodiment is represented by t2 and is substantially equal to or greater than wall thickness t1 of the side wall portion 7b. For example, if t1 is 6.0 mm, t2 becomes about 6.0–7.0 mm. The outer cylindrical portion 7c has intermediate stepped portion 7f. The portion of the outer cylinder portion 7c to the right (in the drawing) of the stepped portion 7f, has an inside diameter D1 at the bottom of the spline grooves 7e which is slightly increased to D2 (>D1). The spline grooves 7e are formed so that the wall thickness t6 (e.g., 3.0–4.0 mm) at the bottom of the grooves is maintained in the portions to the right and left (in the drawing) of the stepped portion 7f, that is, the groove depth increases at the distal end of cylinder portion 7c (the right side in the drawing) without an excessive decrease in the wall thicknesses t6, t2. Located to the right of the stepped portion 7f, that is, adjacent the distal end of the cylinder portion 7c, is an annular snap ring engagement groove 7g. Further to the right, the extreme distal end of the cylinderical portion, is not provided with the spline grooves 7e, and provides an escape portion 7h of a slightly increased inner diameter. In contrast, if the wall thickness t1 of a side wall portion is set to 6.0 mm in a front cover formed by a conventional method, the wall thickness t2 of the outer cylindrical portion becomes about 4.3 mm, and the wall thickness t6 at the bottom of the spline grooves becomes about 2.1 mm. Thus, the degree of freedom in providing a suitable wall thickness for the outer cylindrical portion becomes substantially nil, and the wall thickness is excessively reduced.

In this embodiment, even if the wall thickness t6 at the bottom of the spline grooves becomes less than the wall thickness t1 of the sidewall portion 7b, due to the hardening occurring during the process of forming the spline grooves 7e, a sufficient pressure resistance can be achieved. However, the wall thickness t6 at bottom of the spline grooves may be set equal to or greater than the wall thickness t1 of the side wall portion.

As shown in FIG. 1, the torque converter body 3 has an impeller 9, a turbine 10, and a stator 11. The impeller 9 has an impeller hub 9a, and an impeller shell 9b. The impeller shell 9b is fixed and sealed to the escape portion 7h of the outer cylindrical portion 7c by welding the entire circumference thereof.

The stator 11 is supported by a stationary shaft via a one-way clutch 12. The turbine 10 is supported by a turbine hub 10a. The turbine hub 10a is connected to an input shaft of a transmission (not shown) via spline grooves 10b. Furthermore, the turbine hub 10a is provided with a lockup clutch 13 of the lockup device 5.

The lockup clutch 13 has a disc member 13b that is connected at its base to the turbine hub 10a. A plurality of disc-shaped driven plates 13a are splined into an outer peripheral portion of the disc member 13b. The driven plates 13a are spaced apart from one another by a predetermined interval in the directions of the arrows A and B.

A plurality of drive plates 13c are engaged with the spline grooves 7e of the front cover 2, arranged alternating with the driven plates 13a, and are rotatable together with the front cover 2. The drive plates 13c are stopped in movement in the direction indicated by the arrow B by a snap ring 15 fitted into and engaged within the snap ring engagement groove 7g, so that the drive plates 13c are retained within the spline grooves 7e. A piston member 16 that forms the lockup device 5 is spline-engaged with the extreme left (FIG. 1) portion of the spline grooves 7e and is slidable in the directions indicated by the arrows A, B. The piston member 16 defines a hydraulic chamber 17, together with cylinder facing portion 7d of the front cover 2.

With the torque converter 1 of the construction as described above, rotation from an engine (not shown) is input to the front cover 2, and turns the impellor shell 9b and the impellor 9, and then is output from the turbine hub 10a to the transmission (not shown) via an operating fluid contained in the torque converter 1, and the turbine 10. For engagement of the lockup device 5, a hydraulic pressure is supplied to the hydraulic chamber 17 and drives the piston member 16 to the right in FIG. 1 so that the driven plates 13a of the lockup clutch 13 contact the drive plates 13c. Therefore, rotation of the front cover 2 is directly output to the transmission via the disc member 13b and the turbine hub 10a, without transmission through the fluid in the torque converter body 3.

During operation of the torque converter 1, the front cover 2 turns at high speeds due to direct input of rotation from the engine. Along with high-speed rotation of the front cover 2, the operating fluid in the torus of the torque converter 1 turns similarly to the rotation of the front cover 2, so that great internal pressures and centrifugal forces are produced inside the torque converter 1. The outer cylindrical portion 7c of the front cover 2 has the wall thicknesses t2, t6 that withstand such great pressures, as well as the spline grooves 7e. Therefore, despite having the spline grooves 7e, the outer cylindrical portion 7c has no excessively thin wall portion, and is therefore sufficiently resistant to high pressures as mentioned above.

Because the torque converter 1 has great internal pressures as mentioned above, if the front cover 2 has an annular recess, such as the snap ring engagement groove 7g, there is a danger of cracking. However, the outer cylindrical portion 7c of the front cover 2 has wall thickness t2, wherein the spline grooves 7e are integrally formed, which is equal to or greater than the wall thickness t1 of the side wall portion. Therefore, the snap ring engagement groove 7g can be formed in the portion of the outer cylinder 7c having the wall thickness t2 which provides sufficient pressure resistance.

In order to provide an appropriate contract area between the snap ring engagement groove 7g and the snap ring 15, the snap ring engagement groove 7g should extend approximately as deep as the bottoms of the spline grooves 7e. In order to ensure sufficient circulation of the operating fluid, stepped portion 7f is provided in the outer cylindrical portion 7c of the body 7, so that the spline grooves 7e are deeper on the outer side of the snap ring 15 than to the left (in FIG. 2) of the spline grooves 7e, so that a gap Gp is formed between the outer periphery of the snap ring 15 and the bottoms of the spline grooves 7e. The gap Gp provides a lubricating fluid passage for reliable circulation of lubricating fluid to drive plates 13c and the driven plates 13a.

Figure 4:
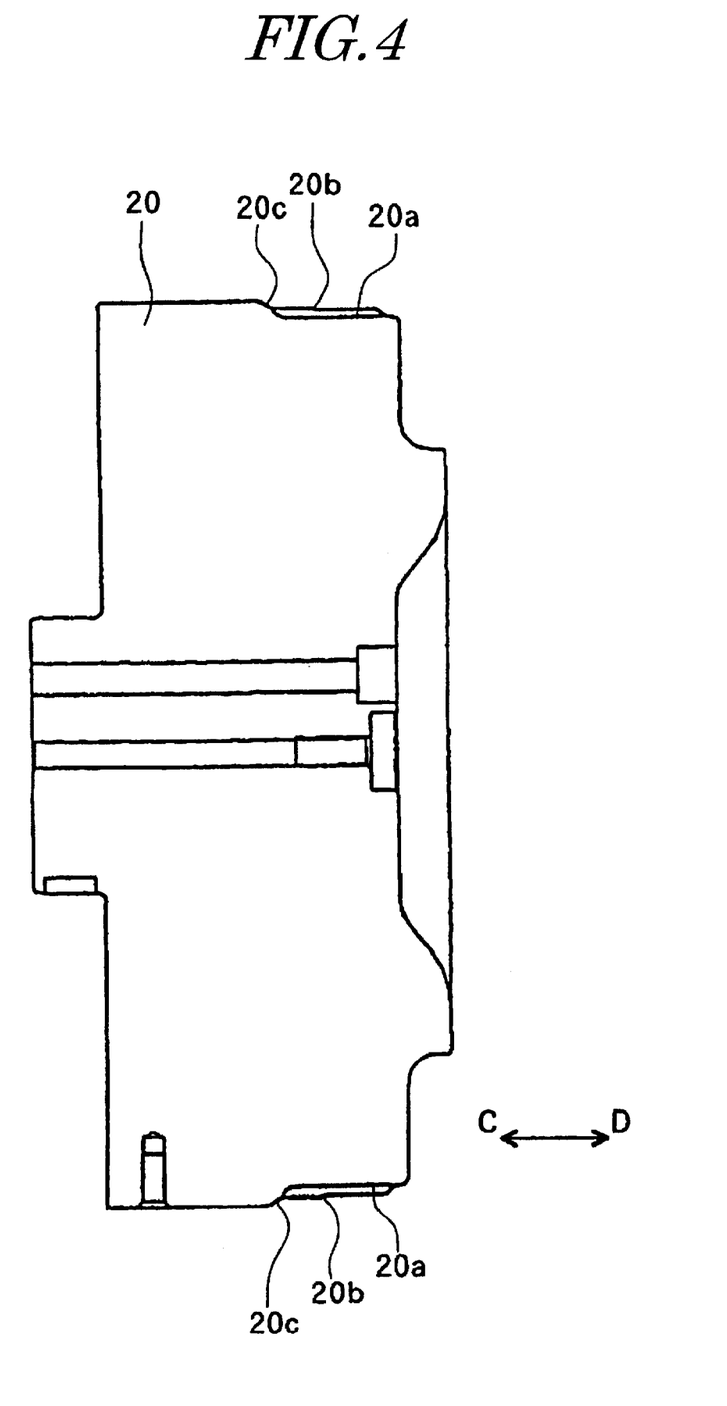
FIG. 4 is a diagram illustrating a mandrel used in the process.
Figure 5:
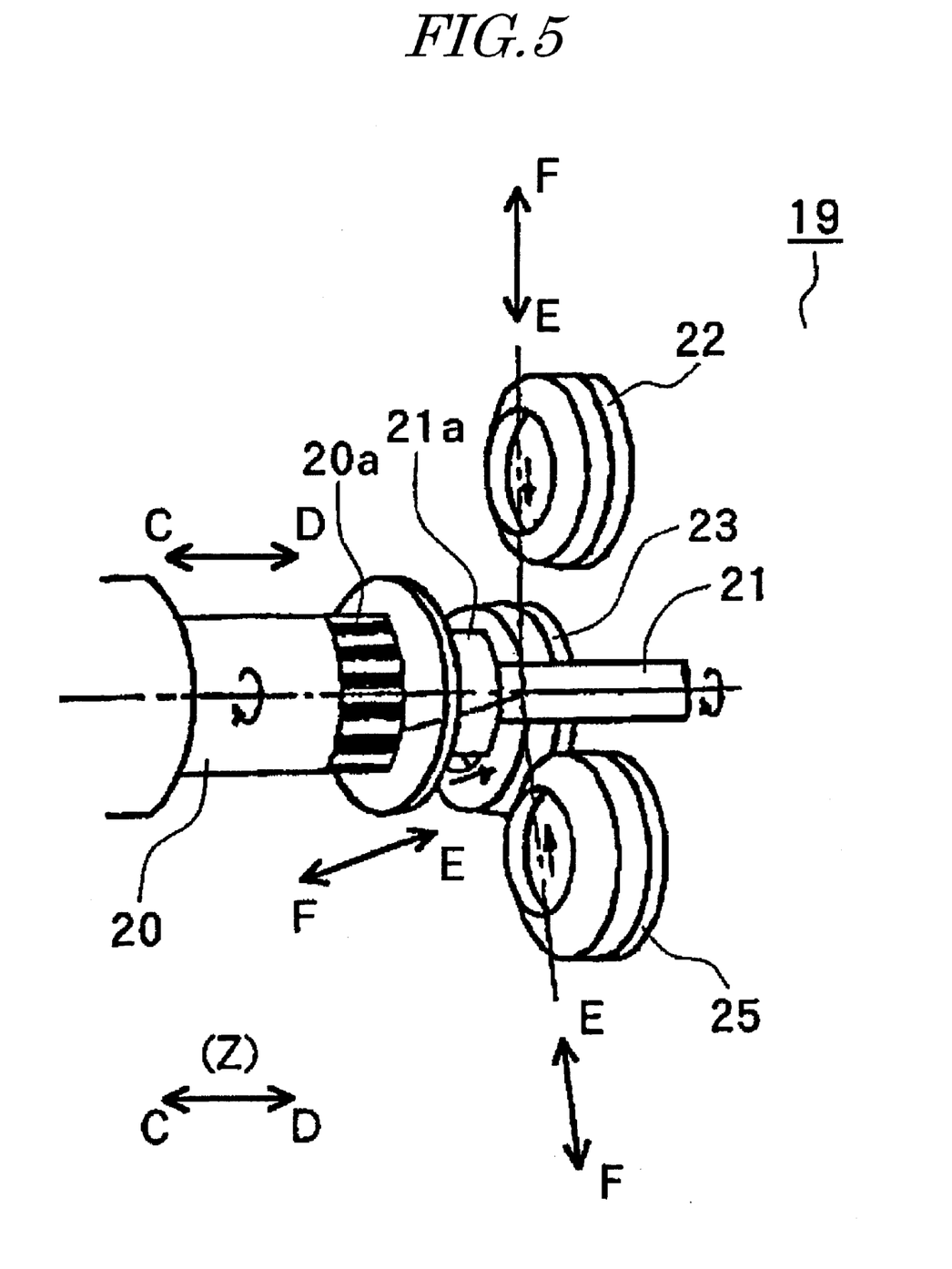
FIG. 5 is a perspective view of an apparatus used in the method illustrated in FIGS. 3(a) to 3(c)

One method for producing the front cover 2 will now be described with reference to FIGS. 4–5, show a processing apparatus 19 having a rotatable mandrel 20. The distal end portion of the mandrel 20 has a plurality of grooves 20a corresponding to the spline grooves 7e that are to be formed in the front cover 2 and extending in the direction indicated by arrows C and D, that is, parallel to the central axis (Z-axis), and are spaced from one another with a predetermined spacing. As shown in FIG. 4, in addition to the grooves 20a, the end portion of the mandrel 20 has a step 20b and an escape portion 20c corresponding to the stepped portion 7f and the escape portion 7h.

As shown in FIG. 5, facing the mandrel 20 is a rotatable tail stock 21 which is slidable along the Z-axis. A distal end of the tail stock 21 has a dish-shaped work 21 has a dish-shaped work pressing portion 21a at a position facing the mandrel 20. A cylindrical rough finish roller 22, a cylindrical intermediate finish roller 23, and a cylindrical finish roller 25 for cold forming are provided around the mandrel 20. The rollers 22, 23, and 25 are rotatable and are movable in the direction indicated by arrows E, F, i.e. radially relative to the central axis of the mandrel 20. In addition to the rollers 22, 23, 25, the apparatus 19 includes a wall thickness-increasing roller 26 as shown in FIG. 3(b) that is movable in the direction indicated by the arrows E, F, i.e. radially relative to the central axis of the mandrel 2. The wall thickness-increasing roller 26 has a recess 26a in the outer peripheral surface of the roller.

Using the apparatus 19 as described above, the front cover 2 is formed in the following manner. First, as shown in FIG. 3(a), a metal plate having a predetermined plate thickness t1 (e.g., 6 mm) is subjected to a pressing process to form a disc-shaped blank 27. The blank 27 is clamped between the mandrel 20 and the tail stock 21, and is held with a predetermined force. The mandrel 20 and the tail stock 21 are then synchronously rotated to turn the blank 27. While the blank 27 is being turned, the thickness-increasing roller 26 is moved in the direction indicated by arrow E while being rotated, to press an outer peripheral portion of the blank 27 in a direction parallel to the central axis of the mandrel 20 as shown in FIG. 3(b). Pressed by the recess 26a of the thickness-increasing roller 26, the outer peripheral portion of the blank 27 is bent and plastically deformed on the surface of the mandrel 20, so that the wall thickness is increased from t1 of the original material to t3 (e.g., 10 mm). Thus, a thickened ("thick-wall") portion 27a is formed.

Preferably, in the first step, the center of the recess 26a of the thickness-increasing roller 26 is contact with the radical outer edge of the blank 27, and the thickness-increasing roller 26 is moved relative to the blank 27 in the direction indicated by the arrow E, with the edge of the blank in contact with a central portion of the recess 26a, so as to press and incline the blank 27 toward the mandrel 20. In the second step, an end side of the recess 26a of the thickness-increasing roller 26 is contact with the end of the blank 27, and the thickness-increasing roller 26 is moved in the direction indicated by the arrow E, so as to press the blank material member 27 and to form the thick wall portion 27a. It is also possible to move the thickness-increasing roller 26 in an oblique direction, intermediate the direction indicated by the arrow E and the direction indicated by arrow C or D.

Figure 6:
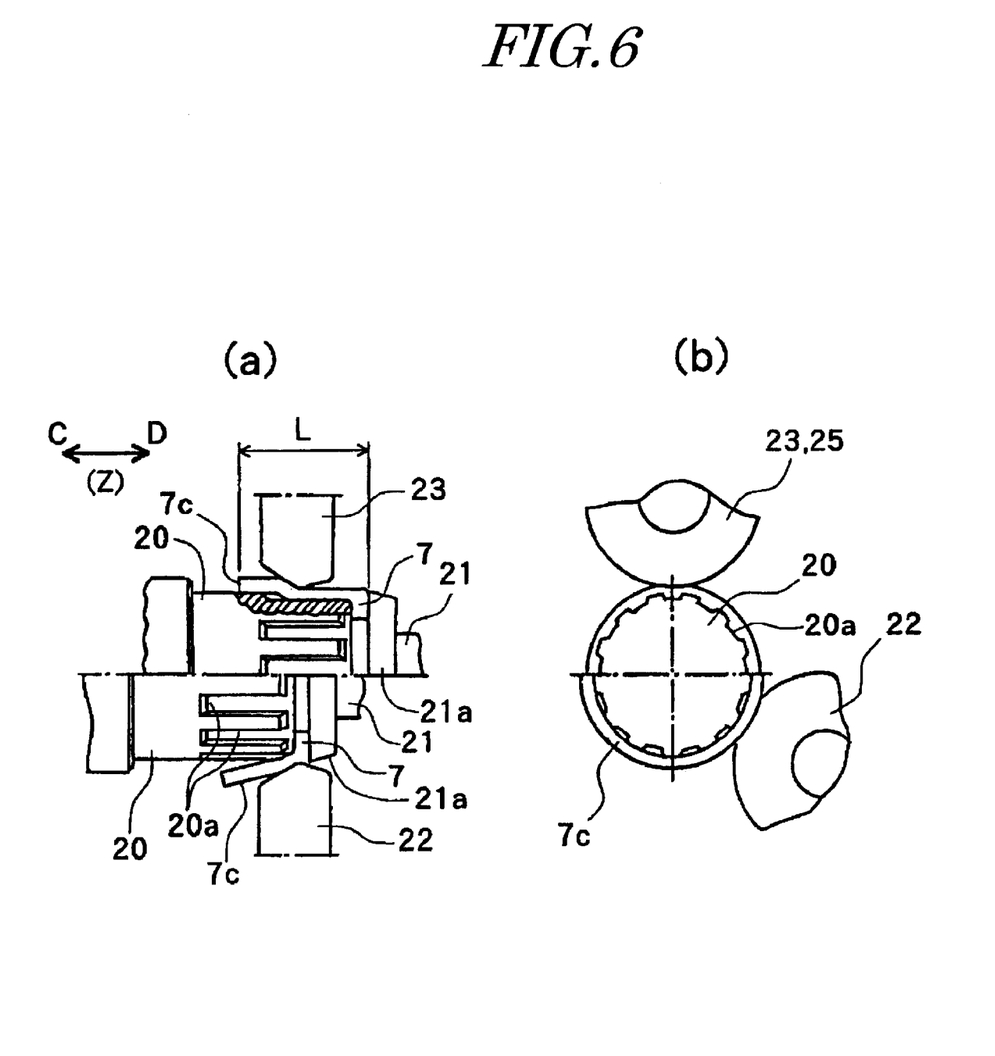
FIGS. 6(a) and 6(b) are an elevational view and a side view of the apparatus shown in FIG. 5, illustrating the forming process.

After the thick wall portion 27a is formed in the edge portion, now a cylindrical portion, of the blank 27, the rough finish roller 22, the intermediate finish roller 23, and the finish roller 25 are rotated and moved in the direction indicated by the arrow E, for cold forming ("flow forming") the thick wall portion 27a of the blank 27. This process is performed by setting the rollers 22, 23, 25 in a formation in which the rollers are spaced from one another by predetermined amounts along the center axis of the mandrel 20, that is, spaced in the dimension indicated by the arrows C, D. The rollers 22, 23, 25, are pressed against the thick wall portion 27a in a direction radially toward the center axis and are simultaneously moved in the direction indicated by the arrow C in FIG. 6, while maintaining their spaced relationship. Thus, the thick wall portion 27a is sequentially processed in the following manner. That is, the thick wall portion 27a is first plastically deformed from the plate thickness t3 to a reduced plate thickness t4 by the rough finish roller 22. The thick wall portion 27a is then plastically deformed from the plate thickness t4 to a reduced plate thickness t5 by the intermediate finish roller 23, and is finally plastically deformed from the plate thickness t5 to a reduced plate thickness t2 (>t1) by the cylindrical finish roller 25.

Figure 7:
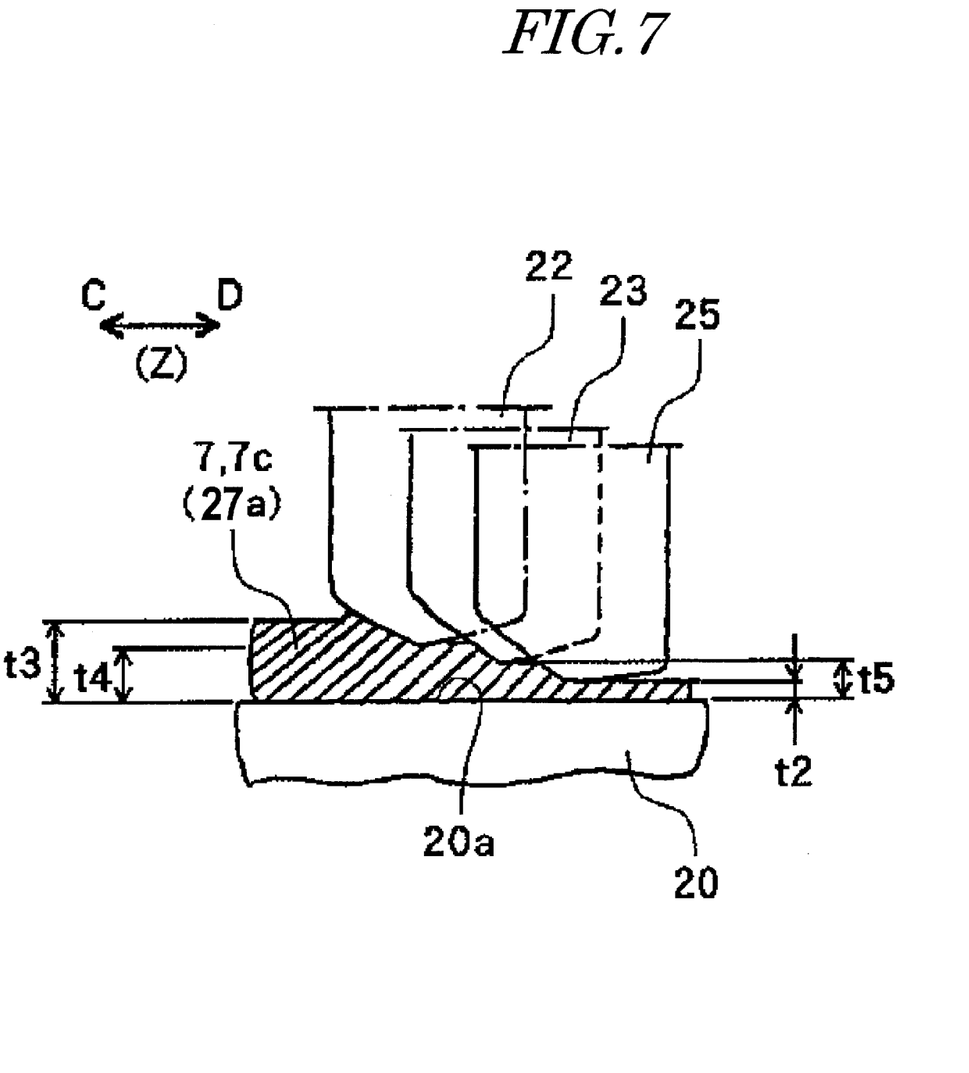
FIG. 7 is a diagram illustrating a manner of operation of various rollers.
Figure 8:
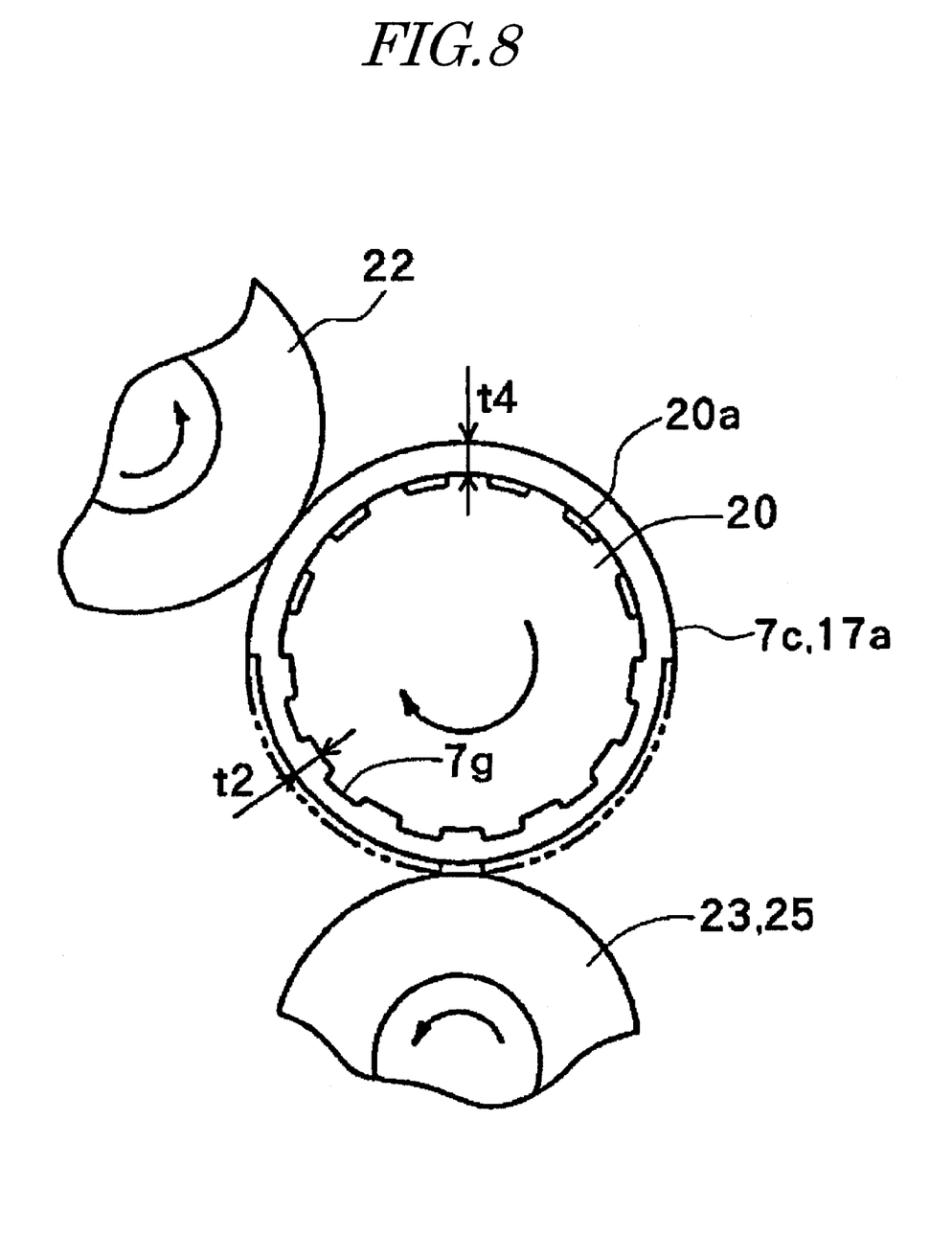
FIG. 8 is a diagram illustrating flow of material into mandrel grooves.

Although in the FIG. 7, the rollers 22, 23, 25 are set positions that are axially spaced apart, i.e. in the direction indicated by the arrows C, D, the rollers may also be set at the same axial position. Furthermore, the rollers 22, 23, 25 and the mandrel 20 need only to be moved relative to each other. In this embodiment, the mandrel 20 and the tail stock 21 clamping the blank material member 27 therebetween are moved in the direction indicated by the arrow D relative to the rollers 22, 23, 25, to perform the forming process. The positioning of the rollers 22, 23, 25 radially and the forces they exert on the blank are controlled by the NC control.

During the forming process, the material of the thick wall portion 27a flows in the direction indicated by the arrow C as indicated in FIGS. 3(c), 6(a), 6(b), and 8, so that the length L of the outer cylindrical portion 7c gradually increases. Furthermore, the material of the thick wall portion 27a flows into the grooves 20a on the cylindrical surface of the mandrel 20. Thus, the cylindrical portion 7C of the body 7 of the front cover 2 is formed integrally with the spline grooves 7e, the stepped portion 7f, and the escape portion 7h.

After the body 7 of the front cover 2 is formed as described above, the body 7 is removed from the mandrel 20. Then, the boss portion 7a is attached to the center of the body 7, and the body is then machined as necessary to complete the formation of the front cover 2.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements.

The entirety of the teachings of Japanese Application No. H11-266,062, filed Sep. 20, 1999, inclusive of its specification, claims and drawings, is incorporated herein by reference.

What is claimed is:

1. A method for producing a cylindrical member, having at least one spline groove on an inner cylindrical surface of an outer cylindrical portion, from a disc-shaped blank of a thickness t1 said method comprising:

forming a thick wall portion of a thickness t2 greater than thickness t1 in the outer cylindrical portion, through plastic deformation of an outer peripheral portion of the blank by bending the outer peripheral portion against a surface of a mandrel using a thickness-increasing roller, said mandrel surface having a shape corresponding to the spline groove; and forming the one spline groove in the inner cylindrical surface by pressing the thick wall portion against said mandrel surface, using a forming roller.

2. The method according to claim 1, wherein the mandrel used to form the thick wall portion through a use of the thickness-increasing roller and the mandrel used for formation of the one spline groove using the forming roller are one and the same mandrel.

3. The method according to claim 1, wherein the cylindrical member is a front cover for a torque converter.

4. The method according to claim 1, wherein the outer cylindrical portion of the cylindrical member is formed so that a wall thickness of the outer cylindrical portion is substantially equal to or greater than a wall thickness of the blank.

5. A cylindrical member having a radially-extending wall and an axially-extending cylindrical portion with at least one spline groove formed in an internal surface thereof, at least an axially extending portion of said cylindrical portion containing said groove having a wall thickness significantly greater than wall thickness of said radially-extending wall, said radially extending wall and said cylindrical portion being integrally formed from a single plate blank by the method of claim 1.

6. The cylindrical member according to claim 5, wherein the cylindrical member is a front cover for a torque converter.

7. The cylindrical member according to claim 5, wherein the cylindrical member is a front cover of a torque converter, and wherein the spline groove has a stepped portion of increased diameter adjacent a distal end thereof, said one groove having a greater depth within said stepped portion, and wherein a snap ring engagement groove is formed in said stepped portion.

8. The method according to claim 1 wherein said outer peripheral portion is bent by the thickness-increasing roller from a position extending radially from a central axis defined by said mandrel to a position against said mandrel surface parallel to the central axis.

* * * * *